Nov. 5, 1957 T. A. RICH 2,812,443
ELECTROSTATIC MICROAMMETER
Filed March 15, 1954 3 Sheets-Sheet 1
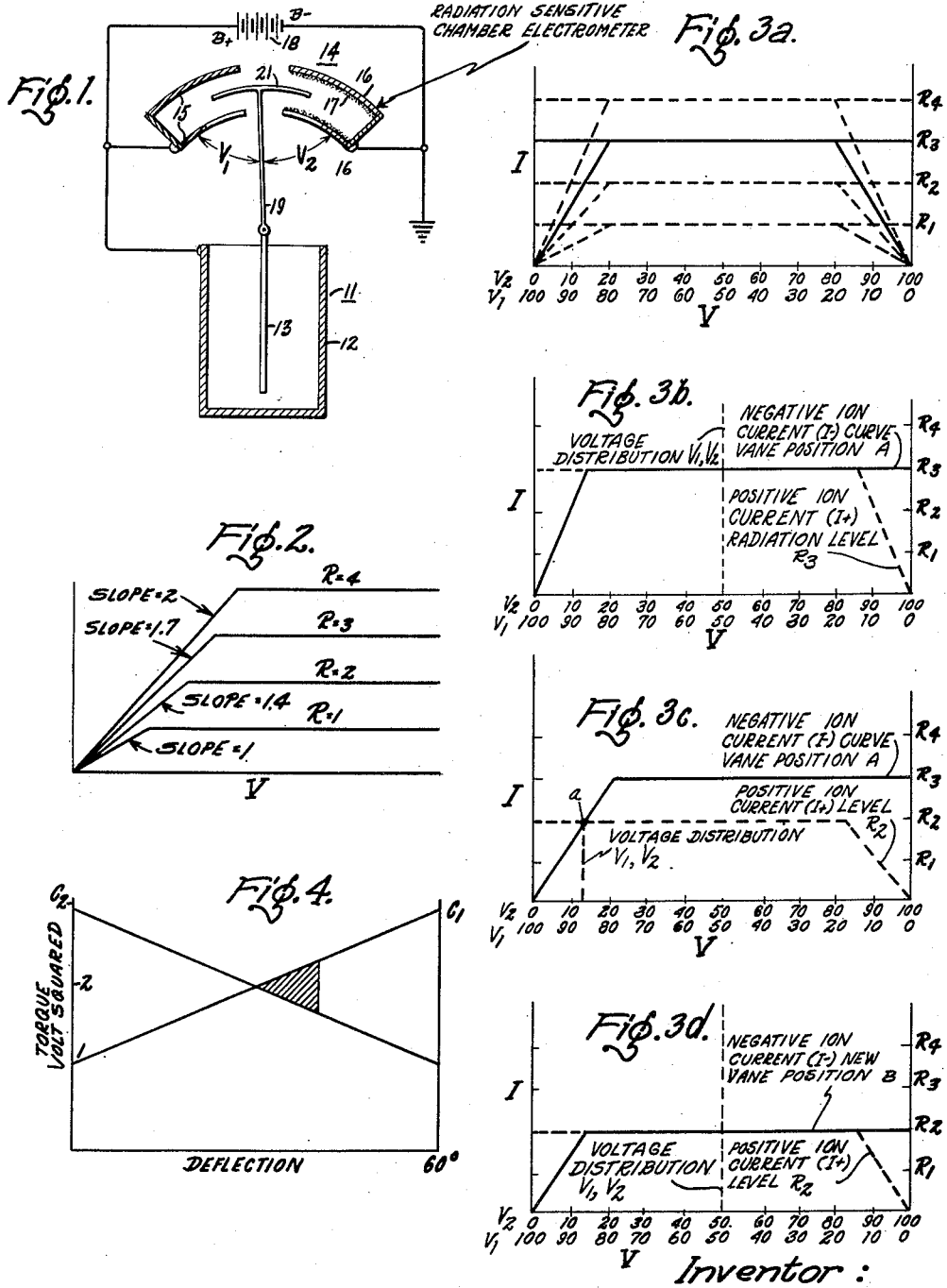
Inventor:
Theodore A. Rich
by Merton D. Moore
His Attorney Nov. 5, 1957 T. A. RICH 2,812,443
ELECTROSTATIC MICROAMMETER
Filed March 15, 1954 3 Sheets-Sheet 2
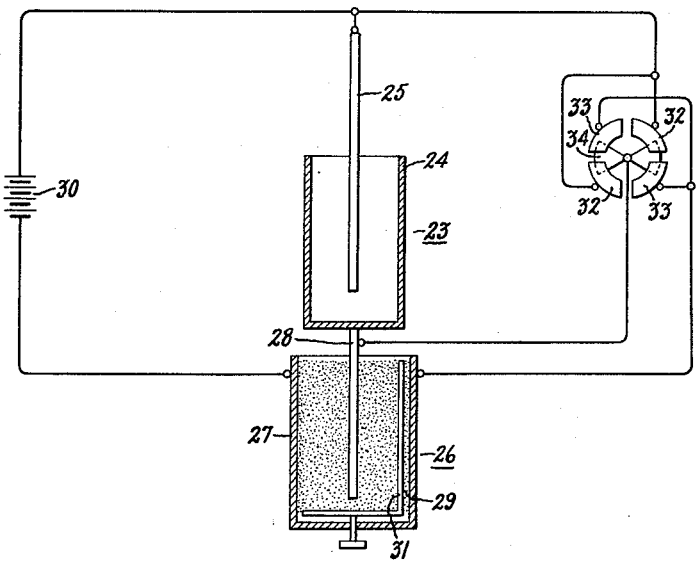
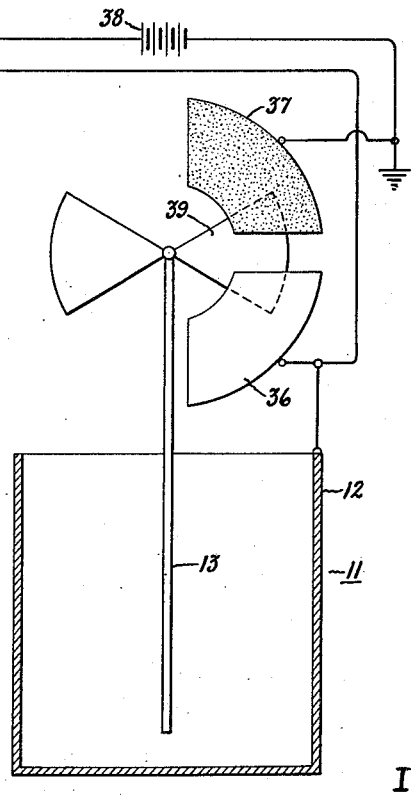
Inventor:
Theodore A. Rich,
by Charles W. Helzer
His Attorney.

Inventor:
Theodore A. Rich,
by Charles W. Helzer
His Attorney.

United States Patent Office 2,812,443
Patented Nov. 5, 1957

2,812,443

ELECTROSTATIC MICROAMMETER

Theodore A. Rich, Schenectady, N. Y., assignor to General Electric Company, a corporation of New York Application March 15, 1954, Serial No. 416,270

11 Claims. (Cl. 250—83.6)

The present invention relates to radiation measuring instruments.

More particularly, the invention relates to an instrument for measuring the intensity of penetrative radiations such as alpha, beta and gamma rays existing in a particular locality.

There are many known radiation measuring instruments available in industry today for measuring the intensity of penetrative radiations such as alpha, beta and gamma rays, and while these instruments are suitable for many purposes, in some respects they have not been entirely satisfactory. More specifically, the response of many of the known instruments of this type is adversely affected by changes over a period of time, due to ageing and the like, in the value of the energizing potential supplied to the instruments. Also, many of the instruments are not sufficiently sensitive to low intensity radiations, and are too readily affected by shock and vibration.

It is therefore one object of the present invention to provide a highly sensitive radiation measuring instrument.

Another object of the invention is to provide a radiation sensitive instrument which is substantially independent of changes in the value of the energizing voltage supplied thereto.

Still another object of the invention is to provide an improved radiation measuring instrument which is dependable in operation, and which is not substantially affected by shock, mechanical vibration and the like.

A still further object of the invention is to provide a radiation measuring instrument wherein extremely large changes in voltage are available for moving an indicating element to indicate relatively small changes in radiation intensity, and wherein the torque required to overcome friction of the indicating element of the instrument is relatively small in comparison to the large changes in voltage available to overcome such torque. In practicing the invention, a radiation measuring instrument is provided which includes first and second radiation sensitive chambers connected in series electrical circuit relationship with the second chamber having a predetermined amount of radioactive material disposed therein. Movable means are operatively coupled to the first and second radiation sensitive chambers in a manner to be responsive to current flow through the chambers for indicating the presence of the penetrative radiations. In one embodiment of the invention, the radiation sensitive chambers comprise an electrometer having at least two sets of spaced apart fixed plates, and a movable vane disposed in the space between the spaced apart plates and adapted to move therebetween. A radioactive material is disposed in the inner surface of at least one of the sets of spaced apart fixed electrometer plates. In another embodiment of the invention, the first and second radiation sensitive chambers comprise ionization chambers connected in series circuit electrical relationship with one of the ionization chambers having radioactive material disposed therein with a conventional quadrant electrometer connected to the ionization chambers for indicating the voltage distribution between the chambers.

Other objects, features and many of the attendant advantages of this invention will be appreciated more readily as the same becomes better understood by reference to the following detailed description, when considered in connection with the accompanying drawings, wherein like parts are identified by the same reference character, and wherein:

Fig. 1 is a schematic view of radiation measuring instrument constructed in accordance with the present invention;

Fig. 2 is a graph of the current and voltage relation existing in a conventional ionization chamber;

Fig. 3a–3d is an idealized graph of the current and voltage relation existing in a radiation measuring instrument such as illustrated in Fig. 1 of the drawings, the actual graph would show the two straight line portions merging without a sharp break;

Fig. 4 is a graph of the torque per volt squared versus deflection of a movable indicating element characteristic of the measuring instrument shown in Fig. 1;

Fig. 5 is a second form of a measuring instrument constructed in accordance with the present invention;

Fig. 6 is a schematic view of still another embodiment of the measuring instrument constructed in accordance with the invention;

Figure 7:
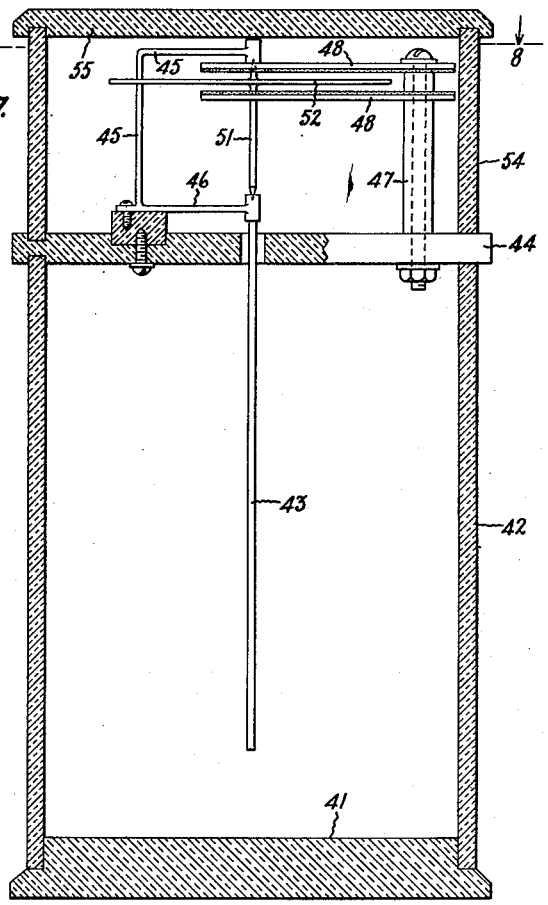
Fig. 7 is a cross-sectional view of a radiation measuring instrument designed for practical use in the field and incorporating the features of the present invention.

The radiation measuring instrument illustrated in Fig. 1 of the drawings includes a first radiation sensitive chamber 11 that preferably comprises an ionization chamber formed by an outer cylindrical electrode 12 and an inner rod-like electrode 13. A second radiation sensitive chamber is connected in series electrical circuit relationship with the first chamber 11 and comprises a portion of an electrometer having at least two sets 15 and 16 of spaced apart fixed plates. A coating of radioactive material 17 is disposed over the inner surface of the set of fixed plates 16 and a source of energizing potential 18 is connected across or between the two sets of spaced apart fixed plates 15 and 16 the latter of which constitutes the second radiation sensitive chamber means. The set of fixed plates 15 is connected directly to the outer cylindrical electrode 12 of the first radiation sensitive chamber 11. The inner electrode 13 of the chamber 11 is connected to the lever arm 19 of a moving element for indicating the presence of penetrative radiation which comprises a movable vane 21 disposed in the space between the spaced apart plates 15 and 16, and movable therebetween. The movable vane 21 is electrically connected to the inner conductive rod 13, and is subjected to the electrostatic field produced by the potential gradients existing between the inner surfaces of the fixed electrometer plates 15 and 16.

The current versus voltage relationship existing in the standard ionization chamber such as that shown at 12 and 13 in Fig. 1, is illustrated in Fig. 2 of the drawings wherein it can be seen that as a rough approximation, the current in the ion chamber is represented by substantially two straight lines. At lower voltages, the slope of the lines is proportional to the square root of the radiation intensity, and at higher excitation voltages, a saturation current is obtained which is proportional to the radiation level. For different radiation levels, this saturation occurs at different values as is illustrated.

In the arrangement shown in Fig. 1 of the drawings movable vane 21 and the fixed electrometer plates 16 operate as an ion chamber so that in effect, there are two ionization chambers connected in series circuit relationship. With this arrangement the distribution of voltage across the two chambers thus formed can be determined graphically in the manner shown in Fig. 3 of the drawings.

The elements 21, 19, and 13 are highly insulated and it therefore follows that in any stable position the net current flow to this system must be zero. If the material 17 is an alpha emitter, ionization due to it will be very largely concentrated in the space between plates 16. The plate 21 will receive ion current primarily from that volume of air lying between 21 and 16, and substantially all of this can be considered due to 17 under the assumption that the volume of 12 is very much greater than the volume between plates 16. Therefore, there is a positive ion flow to 13 from the chamber 12 (and a smaller positive ion flow from 15 to 21, which is negligible in comparison to the other) when radiation is present. There is also a negative ion flow to 21 due to the ion pairs created between plates 16 due to the radioactive material 17. The positive ion current is a function of the external radiation present and the voltage between 12 and 13, and the negative ion current is a function of the position of 21 and the voltage between 21 and 16, as set forth in the following relations:

(1) $I_+ = f(V_1, R)$
(2) $I_- = f(V_2, \theta)$
(3) $V_1 + V_2 = $ constant
(4) $I_+ = I_-$ where $I_+$ = positive ion current
$I_-$ = negative ion current
$V_1$ = voltage 15 to 21
$V_2$ = voltage 21 to 16
$R$ = radiation
$\theta$ = angle of deflection Under these conditions it can be shown that $\theta = f(R)$, that is, the angle of deflection is a function of the radiation present.

In Fig. 3 the element 21 is assumed to be in a fixed angular position and the heavy curve ($I_-$) is a function only of $V_2$. The positive currents for different values of $R$ are shown dotted as $R_1$, $R_2$, $R_3$, $R_4$.

The apparatus illustrated in Figure 1 comprises two radiation sensitive chambers connected in series, one of which produces a positive ion current and the other of which produces a negative ion current. A portion of the apparatus is constituted of an electrometer device including a movable vane 21 which performs the additional function of producing a stable equilibrium position for any radiation level.

The first of the radiation sensitive devices encompasses an ionization chamber 11 constituted of a cylindrical outer member 12 and an inner rod-like member 13. This ion chamber, in conjunction with the fixed plates 15 and the movable vane 21 of the electrometer, comprises the first radiation sensitive means.

These two elements produce a flow or positive ion current upon the impingement of radiation. That is, plates 15 and the cylindrical chamber 12 are connected to the positive terminal of a battery 18. As a consequence, the inner rod member 13, as well as the movable vane member 21, are at a potential which is negative relative to these aforementioned outer members. Hence, should radiation impinge on these chambers and produce ion pairs; i. e., both positive and negative ions, the positive ions will flow towards the rod member 13 and the vane 21 thus causing a positive ion current to flow. Since the chamber 11 is substantially larger than the space between the plates 15, the positive ion current that flows can be considered as substantially that due to the chamber 11. This will become of some significance in discussing, subsequently, the effect of the position of the vane 21 with respect to the plates 15.

The plates 16, on the other hand, constitute the source of negative ion current in this system. The plates 16 contain a coating of radioactive material 17 over the inner surface thereof. Since the plates 16 are connected to ground potential, the vane 21 will have a potential with respect thereto which is positive. As a consequence, any ionization occurring in the chamber due to the emission from the radioactive material 17 causes the negative ions thus produced to migrate to the vane 21 and produce a flow of negative ion current. The negative ion current flowing from the volume of air lying between the plates 16 and be considered as substantially due to the radioactive material 17 lining the inner portion of that chamber. That is, due to the relative sizes of the air volume of the chamber 11 and the air space lying between the plates 16, any small ionization due to external radiation can be considered as exclusively due to the chamber 11. Thus, to review briefly, there is present a negative ion current which may be considered a reference ion current due exclusively to a radioactive material 17 lining the inner face of an ion chamber constituted of the plates 16 and the vane element 21. A positive ion current flows from the chamber 11 and the electrometer plates 15 which can be considered as being exclusively due to the external radiation which it is desired to measure.

The current versus voltage relationship which exists in standard ionization chambers of the type illustrated in Figure 1, is shown in Figure 2 of the drawings where it can be seen that as a rough approximation, the current in the ion chamber at low voltages, is proportional to the square root of the radiation intensity, while at higher excitation voltages, a saturation current proportional to the radiation level flows. For different radiation levels, this saturation current has different magnitudes. Thus, the positive ion current which will flow in the system from the chamber 12 plus the volume represented by the plates 15 will vary with the radiation intensity as is illustrated quite clearly in Figure 2.

The negative ion current which is due almost exclusively to the presence of the radioactive foil 17 within the plates 16 may similarly be represented by a curve of the type shown in Figure 2. That is, one portion of the curve illustrating the range wherein a current is proportional to the square root of the radiation intensity, while the remaining portion represents a saturation current condition. However, the specific characteristics of this curve is a function of the position of the vane 21 within the plates 16. Thus, a series of characteristic curves for the negative ion current, of the type illustrated in Figure 2, may be drawn, the various curves representing different positions of the vane 21 within the plates 16. Thus, since the two ion chambers may be represented by a series of characteristic curves respectively, it is possible to determine the distribution of the voltage across the chambers, and consequently the magnitude of current flow by a graphical solution of the type illustrated in Figure 3a.

Up to this point the plates 15, 16 and the vane element 21 have been discussed exclusively in terms of their action as ion chamber elements. However, as is pointed out in the specification, these elements also act as an electrometer apparatus. That is, since the movable vane 21 may assume different angular positions with respect to the electrometer plate elements 15 and 16, the mechanical torques present in the system and their relationship to the voltages, ion currents, and radiation levels, must be examined. In an electrometer of the type illustrated in Figure 1 the mechanical torque on the vane element 21 is independent of position. That is, for any angle $\theta$ that the vane assumes the torque per volt$^2$ is constant. To state that mathematically, the capacity existing between the stationary electrometer plates and the movable vane is a function of the angular displacement. Thus, $$C = k\theta \qquad (1)$$

The mechanical torque on the vane 21 is a function of the voltage squared (that is, the potential difference between the vane 21 and the stationary electrometer plates) and the rate of change of capacity with respect to angular position. Thus, $$T = \tfrac{1}{2} V^2 \frac{dc}{d\theta} \qquad (2)$$

Combining Equations 1 and 2 the torque may then be defined as $$T = \tfrac{1}{2} V^2 K \qquad (3)$$

Consequently, it can be seen that the mechanical torque on the movable vane element 21 is a function of the voltage squared and does not depend on position.

It is also clear that the electrostatic forces, and consequently the mechanical torque, exerted on the vane element 21 by the electrometer plates 15 and 16 respectively are opposed. This is quite apparent when it is considered that the electrometer plates 15 are connected to the positive terminal of the battery 18 whereas the electrometer plates 16 are connected to ground and the negative terminal of the battery 18. As a consequence, potential differences ($V_1$, $V_2$) exist between the movable vane 21 and the electrometer plates 15 and 16 respectively which tend to produce opposing electrostatic forces and hence opposing torques.

For the system to come to equilibrium and for the vane 21 to assume a stable position, the potential difference between the vane 21 and the respective electrometer plates 15 and 16 must be equal. This is obvious from an examination of Equation 3 above which indicates that the mechanical torque on the vane 21 is the function of the voltage squared and, consequently, for the torques to be equal the voltages relative to the respective electrometer plates must be equal. To recapitulate briefly, in order for the electrometer vane 21 to reach a position of mechanical equilibrium, it is necessary that the electrostatic forces and consequently the torques acting thereon be equal; that is, $$V_1 = V_2$$

In addition, in order that this system may reach equilibrium and provide an indication of the radiation levels being measured, it is necessary that the system reach electrical equilibrium. That becomes obvious when it is recognized that the vane element 21, the rod element 13, and the connecting link 19 are highly insulated from the rest of the system and, as a result, it follows that in any stable condition of the system the net current flow to this system must be zero. Stating it another way, the positive ion current produced by the radiation impinging on the system must equal the negative ion current produced by the radioactive foil element 17 positioned within the electrometer plates 16. This may be achieved, broadly speaking, by controlling the position of vane 21 relative to the electrometer plates 16, since as pointed out previously it is possible to control the amount of negative ion current drawn from these electrometer plates until equality between the ion currents is achieved. That is, the characteristic curve for the negative ion current is manipulated by controlling the position of the vane 21 until equality is achieved between positive and negative ion currents.

The manner in which this is accomplished can be most readily understood in conjunction with the subsequent graphs which are a more detailed illustration of the graphical solution shown in Figure 3 of the application.

Assume, for the moment, that the vane element 21 has assumed a fixed angular position A representing an equilibrium condition both mechanically and electrically. In Figure 3b this condition is illustrated graphically. This figure illustrates, by means of the solid line, the characteristic curve for the negative ion current $I_-$ for a fixed position A of the vane element 21. For equilibrium to exist in the apparatus, a condition postulated for the immediate purpose, a radiation level $R_3$ must exist. The characteristic curve of the chamber 11 and plates 15 is illustrated by the dashed curve which, for one portion thereof, is superimposed on the characteristic curve $I_-$. As can be readily seen from this curve, the positive ion current as represented by the dashed line has a magnitude, in a saturated condition, which is equal to the negative ion current represented by the solid line. As a consequence, the net current flow in the system is zero. It is also clear that at this position of the vane 21 mechanical equilibrium must exist. That is, the torques exerted upon the vane 21 by the respective electrometer plate elements 15 and 16 must be equal. As a consequence, $$V_1 = V_2$$

for this condition.

Now, if the external radiation level changes to the value of $R_2$, which is lower than that existing previously, the equilibrium condition of the device is upset. As can be seen from Figure 3c the characteristic curve for the positive ion current, which is shown by the dashed curve, produces a positive ion current $I_+$ which is of a lower magnitude than the negative ion current represented by the solid curve, which exists instantaneously with the vane 21 remaining fixed in its position A. Hence, an unstable condition exists since more negative than positive ion current flows.

The result of this electrically unstable condition is that the distribution of the voltages $V_1$ and $V_2$ change in such a manner as to tend to bring the system into an equilibrium condition electrically. That is, the voltages change in such a direction as to bring the negative ion current to a value which is equal to that of the positive current. That condition being represented by the point $a$ at the intersection of the two curves. It can be seen that the voltage $V_2$; i. e., that existing between the vane 21 and the electrometer plates 16, is reduced to 12 volts; and the voltage $V_1$, that existing between the vane and the electrometer plates 15, is increased to 88 volts. A result of the change in voltage distribution between the vane and the respective electrometer plates is that the mechanical equilibrium of the system is upset. That is, since the torque applied to the electrostatic vane 21 is a function of the voltage relative to the respective electrometer plates, the described change in voltage distribution causes a torque to be applied to the vane 21 which draws it in the direction of the electrometer plates 15 and away from the electrometer plates 16. This movement of the vane 21 continues until the voltage $V_1$ is once more equal to the voltage $V_2$, the only stable voltage distribution for the system.

As a result of the physical movement of the vane 21, the vane assumes a new position of equilibrium relative to the electrometer plates 16 which may be denominated as position B. The effect on the characteristic curve of the negative ion current of this move is illustrated in Figure 3d.

Figure 3d illustrates that the movement of the vane 21 out of the electrometer plates 16 changes the characteristic curve of the negative ion current to such an extent that this curve, illustrated by the solid line, is once again partially superimposed upon the positive ion curve, illustrated by the dashed line. As can be seen from this curve, the movement of the vane 21 to the new equilibrium position B reduces the magnitude of the negative ion current so that it equals the positive ion current flowing due to the external radiation $R_2$. Thus, the change in the magnitude of the external radiation changes the voltage distribution across the electrometer element developing a large correcting voltage which causes the movable vane to move out of the electrometer plates 16 until a mechanical equilibrium is achieved, which simultaneously changes the characteristic curve of the negative ion current flow so as to bring the system into electrical equilibrium by equalizing the positive and negative ion currents.

The fact that the movable vane 21 has moved further in between the electrometer plates 15 does not have any significant effect on the operation of the system since, as pointed out previously, the positive ion current which flows is almost exclusively due to the ion chamber 11 due to the relative sizes of the two chambers and, as a consequence, the position of the vane 21 relative to plates 15 causes a negligible change in the positive ion current and minimizes the effects of the electrometer plates 15.

Thus, it can be seen that relatively small changes in the external radiation level produce extremely large changes in the voltage distribution across the electrometer portion of the device. This large change in voltage distribution causes a movement of the movable vane 21 in such a direction as to stabilize the system by controlling the magnitude of the negative ion current flowing until it equals the positive ion current due to the external radiation. Hence, the system produces a relatively large correcting voltage developed across the vane in a direction to move the vane back to its balanced position by varying the characteristic curve of the negative ion current until it matches that of the ion chamber producing the positive ion current. Thus, a highly sensitive and self-correcting radiation detecting apparatus is achieved by means of the instant construction.

It is obvious from the above discussion that should the external radiation increase to $R_4$, the mechanism would operate in a very similar fashion by increasing $V_2$ and decreasing $V_1$. This would draw vane 21 towards plates 16 and increase the negative ion current $I_-$ until it equals the positive ion current $I_+$ due to the radiation level at which time a new mechanical and electrical equilibrium condition would exist.

The stability which the instrument incorporates can better be appreciated from an examination of the graph illustrated in Fig. 4 of the drawings wherein a possible torque per volt squared characteristic of the instrument is plotted against the deflection of the movable vane 21. Such a characteristic would make an electrostatic ratio meter where the deflection depends on the ratio of $V_1$ to $V_2$. This is not necessarily a more desirable condition than constant torque efficiency but is taken to illustrate conditions when constant efficiency does not exist. The torques due to $V_1$ and $V_2$ would have to be equal at a point of stability. As shown at 30° the torques are equal if $V_1=V_2$, at zero degrees $$V_1=\sqrt[2]{3}V_2$$

and so on. If the voltages are constant then the forces available to return the system are due to the differences in the two torques. Should the vane thereafter be moved due to mechanical shock or vibration over to a position such as shown at 22, the cross-hatched area or portion of the curve under curve C1 indicates the available torque for returning the vane to its null or balanced position. This value is always a fraction of either the clockwise or the counterclockwise torque as in all simple instruments. On the other hand, using the arrangement here, if there is a displacement from the stable position there is also a change in the voltage as shown in Fig. 3. This change in voltage can produce a large change in torques for a small change in position—theoretically it would be possible to get a change of the whole battery voltage for a very minor displacement. This is in sharp contrast to a conventional design, and produces large torque gradients with respect to position. Now if the condition of Fig. 4 existed, the analysis as shown in Fig. 3 would still apply. As shown there for $R_3$, $V_1$ can be any voltage between 20 volts and 80 volts and $V_2$ correspondingly between 80 volts and 20 volts. In an actual case the horizontal parts of the curves in Fig. 3 will have a minor slope and this will slightly modify the analysis. In practice the calibration would be done with a radioactive source and not by graphical construction which is given here only to better explain the action.

A second embodiment of a measuring instrument constructed in accordance with the invention is illustrated in Fig. 5 of the drawings. This embodiment of the invention comprises a first radiation-sensitive chamber 23 formed by a conventional ionization chamber having an outer cylindrical electrode 24 and an inner rod-like electrode 25. A second radiation sensitive chamber 26 is connected in electrical series circuit relationship with the first radiation sensitive chamber 23, and comprises an outer cylindrical electrode 27 and an inner rod-like electrode 28 connected to the outer cylindrical electrode 24 of the first ionization chamber 23. The outer cylindrical electrode 27 of the second radiation sensitive chamber 26 has a coating 29 of radioactive material formed over the interior surface thereof, and has a rotatable shield 31 mounted therein for controlling the amount of radioactive material exposed to the interior of the chamber. A source of energizing potential comprising a battery 30 is connected across the series connected ionization chambers, and an indicating instrument comprising a conventional quadrnat electrometer having the two sets of diagonally opposed fixed electrometer plates 32 and 33, and a movable vane 34, is connected across the series connected radiation sensitive chambers 23 and 26. The movable vane 34 of the quadrant electrometer is connected directly to the inner rod-like electrode 28 and to the outer cylindrical electrode 24, one set of diagonally opposed fixed plates 32 are connected to the inner rod-like electrode 25 of the first radiation sensitive chamber 23, and the remaining diagonally opposite set of fixed electrometer plates 33 are connected to the outer cylindrical electrode 27 of the second radiation sensitive chamber. In this manner two diagonally opposite sets of fixed electrometer plates are connected effectively across the energizing source 32, and the movable vane 34 is connected to an equivalent mid-tap point on the series connected radiation sensitive chambers.

In operation, the embodiment of the invention shown in Fig. 5 of the drawings is entirely similar to that shown in Fig. 1 and described in connection with relation to Figs. 2 through 4. In particular, a plot of the ion currents flowing in the series connected radiation sensitive chambers 24 and 27 is identical to that shown in Fig. 3 of the drawings. Hence, very substantial changes in the energizing voltage applied to the series connected radiation sensitive chambers, does not affect the ionization current flowing therethrough. Likewise, should a change in radiation level occur, a very large change in voltage across the opposite ionization chamber results so that large torques are available for moving the indicating vane 34. To facilitate operation of the instrument, the adjustable shield 31 is provided so that the ionization current flowing in the radiation sensitive chamber 26 can be adjusted to equal the normal background radiations reaching the radiation sensitive chamber 23. Subsequent to such adjustment, should the intensity of the radiations reaching the chamber 23 change, this change results in the very large change in voltage appearing across the chamber 26, and will be indicated by the electrometer 34. From this description, it can be appreciated that many of the advantages of the structure shown in Fig. 1 of the drawing, are incorporated in the embodiment of the invention shown in Fig. 5. Here the null balance is obtained manually and the electrometer is used only to indicate a rough balance of voltages. The electrometer requirements are not severe; it need not be very sensitive because the voltage changes are large and it need not even be particularly stable for the same reason.

Still a third form of the invention is illustrated in Fig. 6 of the drawings which differs from that illustrated in Fig. 1 only in the construction of the indicating electrometer and second radiation sensitive chamber, otherwise the instruments are entirely similar. Consequently, like parts in the two instruments will be labeled by the same reference numeral. The instrument shown in Fig. 6 comprises a first radiation sensitive chamber 11 comprised of an outer cylindrical electrode 12 and an inner rod-like electrode 13. A second radiation sensitive chamber is formed by the two sets of spaced apart, fixed electrometer plates 36 and 37 of a binant electrometer. The set of fixed plates 36 is connected to the outer cylindrical electrode 12 of the first radiation sensitive chamber and to one side of a source of energizing potential 38, while the set of fixed plates 37 are connected through a suitable conductor to the remaining side of the source of energizing potential 38. The inner surfaces of each of the two fixed electrometer plates 37 have a radioactive material coated thereover, and a movable vane 39 is disposed between the spaced apart plates in each of the sets 36 and 37. The movable vane 39 is electrically connected to the inner rod-like electrode 13 of the first radiation sensitive chamber 11.

In operation, ion current through the first radiation sensitive chamber 11 is conducted to the movable vane 39 where it is neutralized by an ion current supplied thereto from the radioactive coating on the fixed electrometer plates 37. In the manner similar to that described with relation to the embodiment of the invention shown in Fig. 1, when the two ionization currents are equal, the movable electrometer vane 39 assume an equilibrium position. Should the level of radiation reach in the radiation sensitive chamber 11 thereafter change, a large change in voltage occurs between the vane 39 and the plates 37, and results in rotating the vane 39 so as to cause the vane to seek out or assume new equilibrium position and thereby indicate a change in the radiation level. The voltage versus current characteristics of the instrument shown in Fig. 6 is identical to that shown in Fig. 3 of the drawings, and hence the instrument incorporates all of the advantages of the embodiment shown in Fig. 1 in that it is substantially independent of changes in the energizing voltage 38. Likewise with regard to mechanical shock and vibrations, the instrument shown in Fig. 6 is extremely stable since there is a relatively large change in voltage should the vane 39 be mechanically moved from its equilibrium position, which change in voltage develops a comparatively large restoring torque for returning the vane to its equilibrium position.

Figure 8:
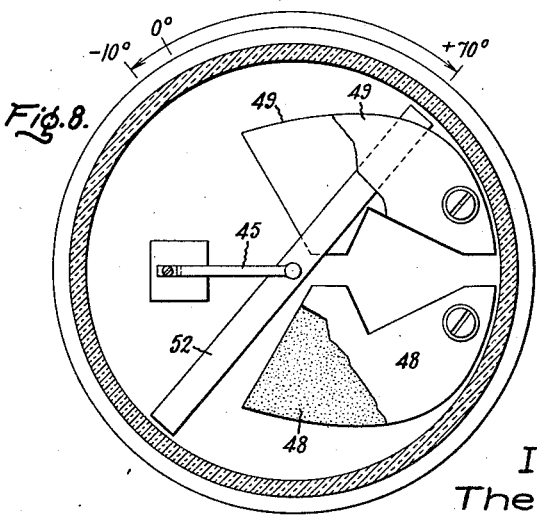
Fig. 8 is a cross-sectional view of the radiation measuring instrument shown in Fig. 7 of the drawings, and taken through plane 8—8 thereof.

A practical design for an instrument constructed in accordance with the principles of the present invention is illustrated in Figs. 7 and 8 of the drawings. Operation of the instrument shown in Figs. 7 and 8 is identical to that shown in Fig. 6 of the drawings in that it utilizes a radioactive material-coated, binant electrometer in combination with an ionization chamber. The instrument comprises a circular base member 41 having an open ended cylindrical body member 42 mounted thereon. The body member 42 has an electrically conductive inner wall surface which coacts with an inner rod-like electrode 43 to form an ionization chamber. Secured to the remaining open end of the body member 42 is a supporting platform 44 of insulating material which has a pair of supporting arms 45 and 46 and a supporting post 47 mounted thereon. Secured to the supporting post 47 are two sets of spaced apart fixed electrometer plates 48 and 49, best seen in Fig. 8 of the drawings, with the fixed electrometer plates 48 having a radioactive material on the inner surfaces thereof. Secured to the end of the supporting arms 45 and 46 are a pair of bearings in which a rotatable shaft 51 is journaled. Secured to the rotatable shaft 51 is a movable vane 52 which is disposed into space between the spaced apart fixed electrometer plates 48 and 49, and is rotatable therein. The vane 52 is electrically conductive, and is connected through the rotatable shaft 51 to the inner rod-like electrically conductive electrode 43. The rod-like inner electrode 43 is supported by the jewel bearing on the end of supporting arm 46 in the chamber formed by the cylindrical body member 42. A suitable closure formed by an open-ended cylindrical member 54 and a circular cap 55 may be provided for enclosing the fixed electrometer plates and the movable vane 52 within a protective housing.

The operation of the arrangement shown in Figs. 7 and 8 of the drawing is exactly like that illustrated schematically in Fig. 6 of the drawing, and hence, will not be repeated. The arrangement has been described, however, for the purpose of disclosing a practical design of an instrument incorporating the features of the invention.

From the foregoing description, it can be appreciated that the present invention provides a new and improved highly sensitive radiation measuring instrument which is substantially independent of changes of energizing voltage supplied thereto, and which is dependable in operation. The instrument is not substantially affected by shock or mechanical vibration to which it might be subjected. It is capable of developing an extremely large change in voltages for producing corrective torques required to overcome the friction of the indicating element whenever such element might be jarred or otherwise moved, and for the form in Fig. 5 is extremely sensitive in that it develops large changes in voltages for relatively small changes in radiation intensity. Additionally, the instrument is capable of being provided in a compact relatively inexpensive form to manufacture.

It is believed obvious that other modifications and variations of the present invention are possible in the light of the above teachings. It is, therefore, to be understood that changes may be made herein which are within the full intended scope of the invention as defined by the appended claims.

What I claim as new and desire to secure by Letters Patent of the United States is:

1. A radiation measuring instrument including in combination first and second radiation sensitive chambers connected in series electrical circuit relationship, said second chamber having a predetermined amount of radioactive material disposed therein, and movable means adjacent said radioactive material and operatively coupled to said first and second radiation sensitive chambers and responsive to current flow therein for indicating the presence of penetrative radiations.

2. A radiation measuring instrument including in combination first and second radiation sensitive chambers connected in series electrical circuit relationship, said second chamber having a predetermined amount of radioactive material disposed therein, movable means adjacent said radioactive material and operatively coupled to said first and second radiation sensitive chambers and responsive to current flow therein for indicating the presence of penetrative radiations, and a source of energizing potential connected across said series connected first and second radiation sensitive chambers.

3. A radiation measuring instrument including in combination first and second radiation sensitive chambers connected in series electrical circuit relationship, said second chamber having a predetermined amount of radioactive material disposed therein, means for controlling the amount of radioactive material exposed to said second radiation sensitive chamber, and movable means adjacent said radioactive material and operatively coupled to said first and second radiation sensitive chambers and responsive to current flow therein for indicating the presence of penetrative radiations.

4. A radiation measuring instrument including in combination an ion chamber, an electrometer having at least two sets of spaced apart fixed plates and a movable vane disposed therebetween, a radioactive coating on the inner surfaces of at least one of said sets of spaced apart fixed electrometer plates, an ionization chamber having the outer electrode thereof connected to the remaining set of spaced apart fixed electrodes and having an inner electrode thereof connected to the movable vane of said electrometer, and a source of energizing potential connected across the different sets of spaced apart fixed plates.

5. A radiation measuring instrument comprising an electrometer having at least two sets of spaced apart fixed plates, a movable vane disposed in the space between said spaced apart plates and adapted to move therebetween, and a radioactive material disposed on the inner surfaces of at least one of said sets of spaced apart fixed electrometer plates.

6. A radiation measuring instrument including in combination first and second ionization chambers connected in series electrical circuit relationship, said second ionization chamber having radioactive material disposed therein, and a movable shield supported in said second ionization chamber for controlling the amount of radioactive material exposed within the chamber.

7. A radiation measuring instrument including in combination first and second ionization chambers connected in series electrical circuit relationship, said second ionization chamber having radioactive material disposed therein, a movable shield supported in said second ionization chamber for controlling the amount of radioactive material exposed within the chamber, a source of energizing potential connected across said series connected ionization chambers, and an indicating instrument connected across said series connected ionization chambers in parallel circuit relationship with said source of energizing potential.

8. A radiation measuring instrument comprising a quadrant electrometer having four sets of spaced apart fixed plates arranged circumferentially around a central axis, two diagonally opposite sets of said fixed plates having a radioactive coating on the interior surface thereof, and a movable vane disposed in the space between said spaced apart fixed plates and movable therebetween.

9. A radiation measuring instrument comprising a quadrant electrometer having four sets of spaced apart fixed plates arranged circumferentially around a central axis, two diagonally opposite sets of said fixed plates having a radioactive coating on the interior surface thereof, a movable vane disposed in the space between said spaced apart fixed plates and movable therebetween, an electrical conductor interconnecting said pair of radioactive coated sets of fixed plates, an electrical conductor interconnecting the remaining diagonally disposed sets of fixed plates, a source of energizing potential connected between said electrical conductors, and a source of electrical signals to be measured connected to said movable vane.

10. A radiation measuring instrument comprising a quadrant electrometer having four sets of spaced apart fixed plates arranged circumferentially around a central axis, two diagonally opposite sets of said fixed plates having radioactive coating on the interior surface thereof, a movable vane disposed in the space between said spaced apart fixed plates and movable therebetween, an electrical conductor interconnecting said pair of radioactive coated sets of fixed plates, an electrical conductor interconnecting the remaining diagonally disposed sets of fixed plates, a source of energizing potential connected between said electrical conductors, and an ionization chamber having the outer electrode thereof connected to one side of said source of energizing potential and having the inner electrode thereof connected to said movable vane.

11. A radiation measuring instrument comprising a circular base member, an open-ended cylindrical body member having a conductive inner surface, mounted on said circular base member, a supporting platform secured to the end of said cylindrical body member opposite said base member, a conductive rod subtended from said supporting platform and extending into said cylindrical body member, at least two sets of spaced apart fixed electrometer plates mounted on said supporting platform exterior of said cylindrical body member, one of said sets of plates having a radioactive coating on the inner surface thereof, a movable vane disposed in the space between said spaced apart plates and movably mounted on journals supported on said supporting platform, said movable vane and said conductive rod being electrically interconnected, and a cap member enclosing said fixed electrometer plates and movable vane.

References Cited in the file of this patent

UNITED STATES PATENTS

| | | |
|---|---|---|
| 2,610,302 | Christian | Sept. 9, 1952 |
| 2,668,245 | Rich | Feb. 2, 1954 |
| 2,676,270 | Lahti | Apr. 20, 1954 |